INVENTORS
FREDERICK V. GONDECK
LESTER E. HICKOX
THOMAS E. KENNEDY
ARTHUR PEREZ
JAMES F. THOMPSON
BY
*William J. Cerny*
ATTORNEY

United States Patent Office 3,432,378
Patented Mar. 11, 1969

3,432,378
FOAMED CORE LAMINATED STRUCTURE
AND METHOD
Frederick V. Gondeck, Lester E. Hickox, Thomas E. Kennedy, Arthur Perez, and James F. Thompson, Niles, Mich., assignors to Declark, Inc., a corporation of Delaware
Filed Dec. 28, 1964, Ser. No. 421,291
U.S. Cl. 161—44      9 Claims
Int. Cl. B32b 3/30, 3/02

ABSTRACT OF THE DISCLOSURE

A laminated core construction utilizes a supporting frame or form when inserting plastic material between two opposed, supported facings. The supporting form has a blocking means to form the edge construction between the facings that bends the ends of the facings to form two side-by-side channels. The blocking means, which is removed after setting of the core, extends between the two channels to form a generally U-shaped end portion with the laminated core structure providing the only connecting means between the two opposed facings.

---

The present invention relates to a laminated structure of the sandwich type and to a method of forming the same, and more particularly to such a structure and method in which a foamed plastic material is employed for the core.

The use of laminated or sandwich construction for panels as well as curved and other shapes, employing a relatively thick although light core with thin sheets of suitable material adhesively or otherwise secured to its opposite faces is well known. Such a construction results in a combination of strength and rigidity with lightness in the formed structure, which is highly desirable and advantageous in many applications. Foamed plastic materials, for example styrene, are well-adapted for use as the core in such constructions, and have been so used between thin facing sheets of metal, plastic, or other suitable materials. Such foamed plastic materials have an advantage in that they may be introduced between the facings to foam in situ, and to bond with the facings and thus provide an almost integral construction, giving strength and rigidity greater than could be achieved by cementing the facings to a core of the same material separately formed. Because of the multiplicity of cells provided in foamed plastic materials, they have very good heat-insulating characteristics, and accordingly may advantageously be employed in providing protection against heat or cold, as in refrigerated display cases for food products, by way of example.

In the use of a laminated structure employing a foamed plastic material or the like as a core in order to take advantage of its heat-insulating properties, it is desirable that such properties be not nullified to any appreciable extent, as for example by connecting the facings in a manner which permits ready and direct conduction of heat therebetween, or in other words from bypassing the insulation. At the same time, it is desirable and in fact necessary to provide protection for the foamed material at the edges of the structure, or in other words at any edge defined by adjacent edges of the facings and of the core. It is also desirable to protect such an edge against the effect of forces tending to effect separation between the core and the facings, such as impact or pulling actions. The invention in its structural aspect provides an edge construction which affords substantially complete protection to the core against gouging, chipping or other disintegrating action thereon, and also provides a mechanical interlock between the core and the facings, in addition to the bond therebetween, to prevent separation of either facing from the core. Such separation, of course, would result in at least some loss of the desired strength and rigidity of the construction. The edge construction also strengthens the edge of the structure, and facilitates connection of the structure to other elements or parts. At the same time, the edge construction avoids any direct connection between the facings which would provide a heat-conductive path bypassing, and therefore at least partially nullifying, the insulating core.

The provision of the edge construction is included in the forming of the laminated structure. In the operation of foaming the plastic core in situ between the facings, it is of course necessary that the space into which the foamable plastic material is introduced be closed, so that the material will be confined. Accordingly, the jig or other apparatus in which the foaming operation is carried out is provided with means for blocking or damming the space between the edges of the spaced facings. At any edge portion of the laminated structure which is to be provided with the non-conducting, protective, and strengthening construction aforesaid, the operation includes the forming of such edge portion in a manner to provide the desired edge construction in the completed laminated structure.

In the forming of such laminated structures as set forth above, particularly when at least one of the facings is of a plastic or other material which requires curing or setting before it can be employed in such structure, it is advantageous to provide for increased speed in the fabrication of the structure to avoid the delay which otherwise might arise from the period required for setting or curing of the facing. The invention affords the desired speed in manufacture in order to reduce costs, and avoids the delay resulting from the curing or setting, by providing a novel step in such method. This involves the employment of the facing-shaping form or mold as a separable part of the jig or apparatus in which the operation of foaming the core between the spaced facings is performed. By this method, a number of such forms or molds may be employed each supporting a shaped facing in a different stage of curing or setting, successively disposed in the foaming apparatus as the facings reach the desired condition, to allow the manufacture of the structures to proceed at the maximum speed allowed by the foaming operation, without regard to the time required for setting or curing of the facing after its shaping on the form or mold.

It is accordingly an object of the invention to provide an edge construction of a foam core laminated structure which protects the core against damage, prevents separation of the core and facings, and strengthens and rigidifies the edge, while maintaining the heat-insulating effect of the foamed core by providing a gap between the facings.

It is a further object to provide a method of foaming in place between a pair of spaced facings a rigidifiable core of foamed plastic material, which includes the forming of at least certain edge portions to provide a non-conducting, strengthening, and protective edge consturction.

Another object of the invention is the provision of a method of foaming in place a foamed plastic rigidifiable core between a pair of shaped sheet material facings in which at least one of the facings is shaped on a form or mold and said form is employed as a part of a jig or like apparatus to support the shaped facing during the foaming operation.

Other and further objects, advantages, and features of the invention will be apparent to those skilled in the art from the following detailed description thereof, taken in conjunction with the accompanying drawings, in which.

Figure 1:
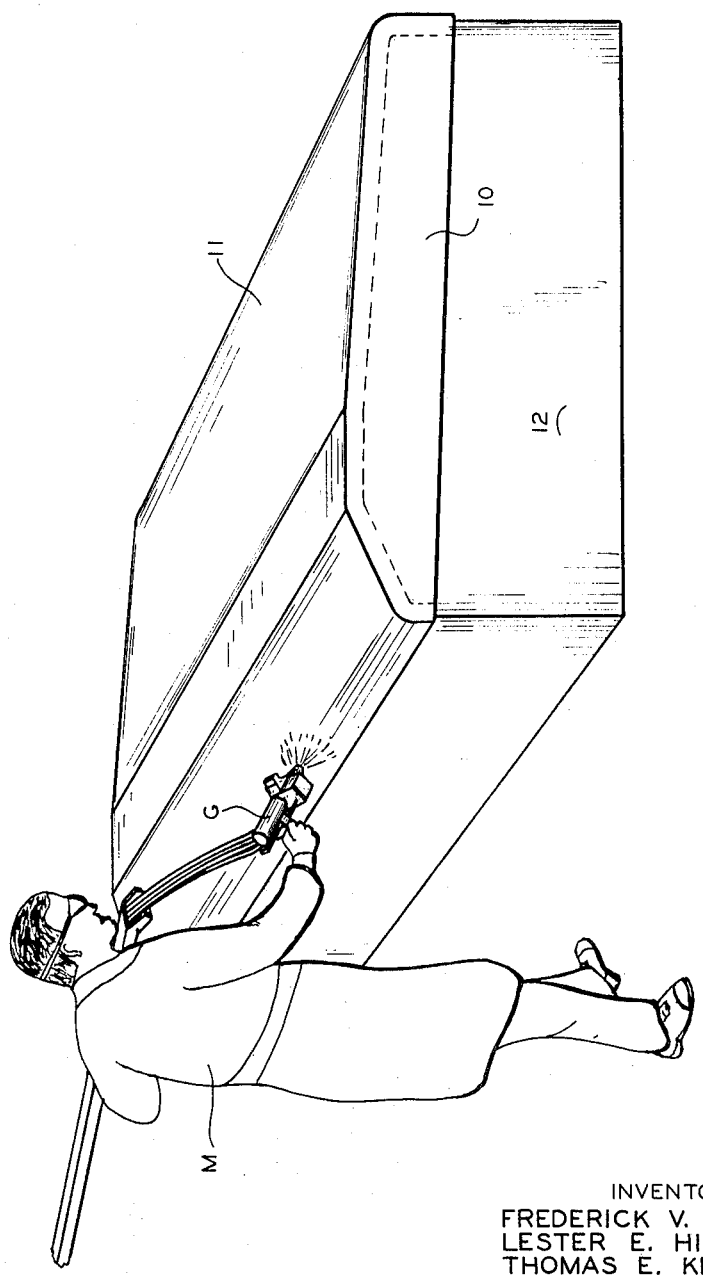
FIGURE 1 is a view illustrating one manner of forming a facing for a foamed-core laminated structure, on a form or mold of predetermined configuration, in accordance with the present invention.

Referring first to FIG. 1 of the drawings, there is shown a mold or form 10 of any suitable material, having the configuration required to impart a predetermined shape to a facing 11 fashioned thereon, in this instance a shallow general U-shape in section. The form 10 is of hollow formation in the present case, although it may be on any desired construction, so long as it presents a forming surface of the shape or contour desired for the facing which is conformed thereto. The facing 11 may be of sheet metal or any other suitable material, and in the instant example is formed of a fiber-reinforced plastic material, provided initially in liquid form for convenience in working, but which cures or otherwise sets into a relatively hard and stiff sheet of the shape determined by the forming surface of the mold or form 10. This facing may be formed from a fabric or mat of loosely woven fibers, such as glass fibers, coated and covered by a suitable plastic material, which may be sprayed in liquid form onto and over the mat after it has been laid over and conformed to the form 10. Again, the facing 11 may be formed by spraying onto the forming surface of the mold or form a mixture of the plastic material and the fibers in a desired proportion. In FIG. 1, an operator M is shown using a spray gun G of appropriate construction to spray material from any suitable source, not shown, onto the form 10. The material sprayed may be taken to be either the mixture of plastic material and fibers as aforesaid, or the plastic material alone applied to sheet or mat of the fibers disposed on the forming surface. In either case, the facing is given whatever thickness is desired for use in the structure to be fabricated. The forming surface of the mold may be treated in any manner appropriate to the material of which the facing is made. The form 10 is shown in FIG. 1 as removably disposed on a support 12 for convenience in the operation of forming the facing, although it may of course be otherwise supported.

The facing 11 is intended as the inner facing or lining for a portion of a laminated structure of relatively deep hollow or U-shaped form, to be disposed in spaced relation to an outer facing of generally similar shape, with the foamed core therebetween. The outer facing, it will be obvious, can be shaped on a hollow mold or form providing an inner forming surface corresponding generally to the forming surface of the form 10, in substantially the same manner as in the case of the facing 11. The invention is not limited to the formation of inner facings of hollow configuration, nor is it limited to the use of hardenable plastic material for the facings. It will be evident that sheet metal, for example, can be shaped on the form 10. Certain aspects of the invention are, however, applicable only with materials of the type requiring a more or less definite time for curing and/or setting, while others are of a more general character and apply in the case of practically any facing material. The use of a plastic material requiring a certain period for setting can cause slowing of production, since unless the foaming operation cannot be completed in less than the same period of time, delay in fabricating the laminated structure will result from the necessity to complete the setting of the facing 11. While a preceding foaming operation may be completed and the foaming apparatus be ready for another such operation, the succeeding operation will have to await the setting of the facing 11. One way of avoiding such delay is to employ a plurality of forms 10, so that more than one facing 11 may be setting to the desired stiffness during the foaming operation, one being in the desired condition for disposition in the foaming apparatus at the end of each foaming operation. By using each form 10 to support the facing thereon during the foaming operation, the loss of time involved in removing the facing from the form and transferring it to the apparatus separately is avoided, as well as the further time required to make certain that the facing is precisely positioned in the jig or apparatus. The invention accordingly contemplates the use of the form 10, in effect, as a separable part of such jig or apparatus, so that each facing 11 may be placed in the apparatus in the proper position in relation to the other facing parts and supported by the form on which it was shaped.

Figure 2:
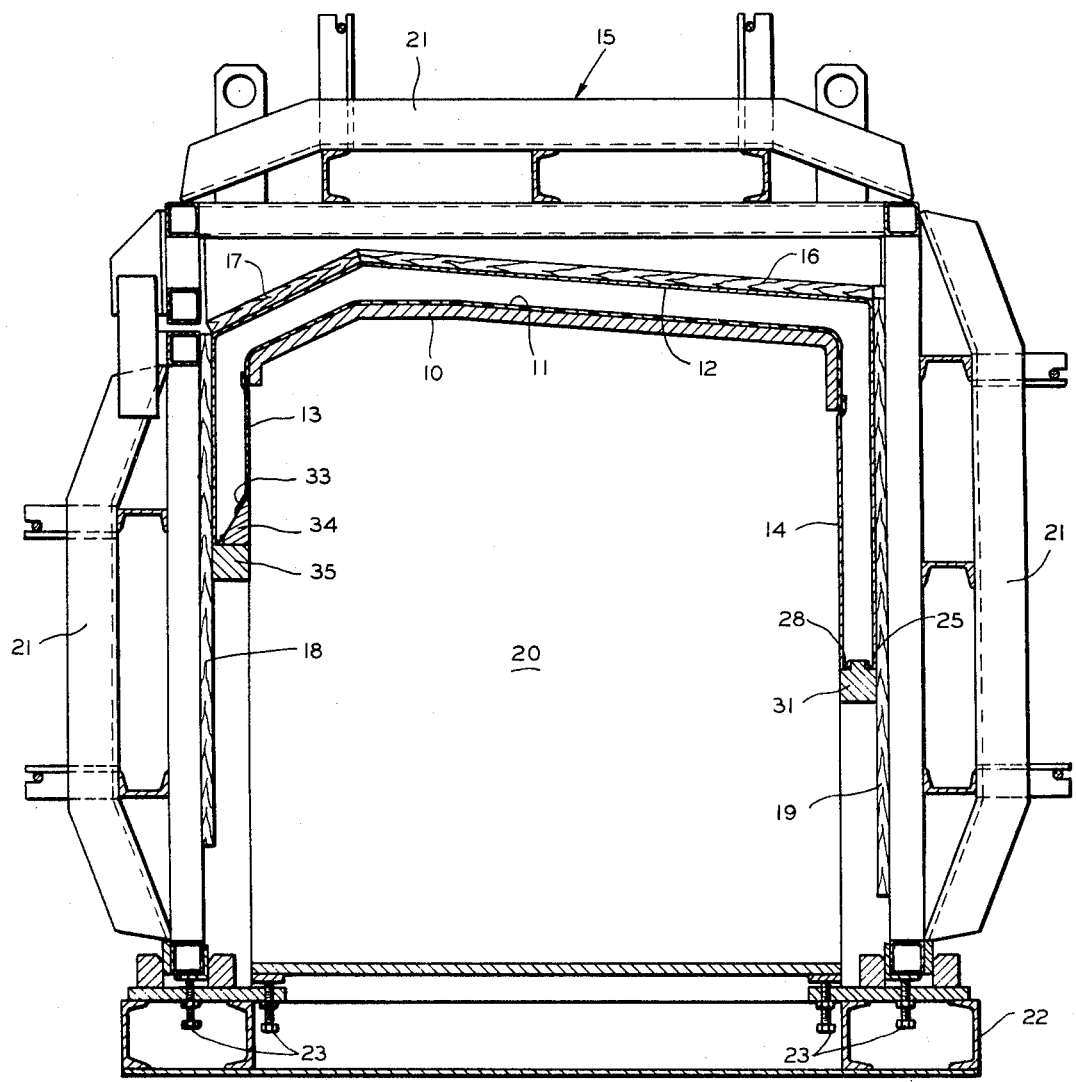
FIGURE 2 is a somewhat diagrammatic cross-sectional view of a foaming jig with the form or mold disposed therein as a part thereof and supporting the facing during the foaming operation.

As best shown in FIG. 2, the facing 11 is disclosed herein as employed with an outer facing 12 of sheet metal having a U-shaped cross section of considerably greater depth than the facing 11, the latter being extended by means of front and rear panels 13 and 14 of sheet metal or other suitable material to provide an inner shell corresponding in depth to the outer facing 12. As shown in FIG. 2, one side of the structure has a height or depth less than the other, the panel 13 being provided at the lower side wall, and the panel 14 at the higher. The panels 13 and 14 are preferably arranged in overlapping relation with the adjacent edges of the facing 11. As shown in FIG. 2, the outer facing 12 and the inner facing 11 with its extending panels 13 and 14 are disposed in a foaming jig generally indicated as 15, the inner shell consisting of the facing 11 and panels 13 and 14 being received in spaced relation within the outer facing 12. The jig 15 is of substantially conventional construction, the details thereof forming no part of the invention, and accordingly is not further described except incidentally in connection with the description of the laminated structure and the method of forming the same. The outer facing 12 is shown as supported against the pressure of the plastic material during foaming thereof by plates 16 and 17 extending transversely of the jig, and corresponding in angular relationship and dimensions to the dished shape of the facing. Vertically disposed plates 18 and 19 extending longitudinally of the jig are provided at the opposite sides to hold the front and rear wall panel portions of the outer facing against declamation during the foaming operation. The jig 15 employs suitable bracing and clamping structure for resisting the falling pressure.

The inner facing 11 is supported on its form 10, which in turn is disposed on a suitable support 20, comprising a number of transverse plates, only one of which is shown, spaced longitudinally of the jig. The plates are formed at their upper portion to receive the form 10 thereon in reinforced relation for resisting the foaming pressure, and to locate the inner facing 11 in the desired spaced relation to the outer facing 12. Of course, other support structure may be employed. The jig is provided with suitable bracing and clamping structure 21 to resist the outward pressure of the foaming operation, as the support 20 resists the inward pressure. A suitable base 22 is provided for the jig, and may include adjusting means 23 for assuring proper relative positioning of the inner and outer facings.

Figure 3:
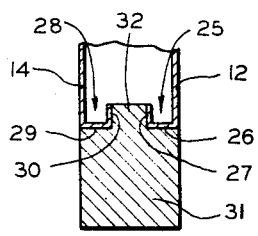
FIGURE 3 is an enlarged fragmentary cross-sectional view of a portion of the jig shown in FIG. 2, showing the manner of providing an edge construction according to the invention.
Figure 4:
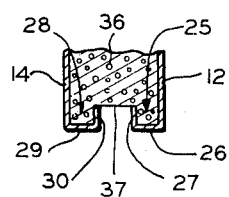
FIGURE 4 is a view similar to FIG. 3, showing in cross section the completed edge construction.

As best shown in FIGS. 3 and 4, the free horizontal edges of the front and rear wall portions of the outer facing 12 have the marginal portions bent to provide with the adjacent wall portion a channel formation or section 25, defined in each case by a web portion 26 extending from the wall portion toward the plane of the panel 13 or 14, and a flange or lip 27 extending from the web portion 26 inwardly relative to the core, and parallel to the respective wall portion. The free marginal portion of the panel 14 adjacent the channeled edge of the rear portion of facing 12 is similarly formed to provide a channel 28, provided by a web portion 29 similar to the portion 26, and a lip or flange 30 extending from the web portion 29 inwardly parallel to the panel 14. A horizontal edge blocking or damming member 31 extends longitudinally of the jig in a position receiving the web portions 26 and 29 thereon. On its upper surface, the dam 31 has a longitudinal rib or projection 32 which has a width equal to the spacing between the lips 27 and 30 of the channels 25 and 28, and a height equal to the height of the lips, as shown in FIG. 3. The front extension panel 13 of the inner facing 11 is of a width or height such as not to extend to the plane of the web 26 of channel 25 on the front wall portion of facing 12, and has its free marginal portion 33 bent at an angle to extend toward the edge of the lip 27, terminating short thereof to leave a non-conducting gap. The angled marginal portion 33 is supported in its angled position by a suitable blocking or damming structure, shown in this case as comprising a longitudinally extending dam 34 of suitable cross section, and including an angled surface extending from the edge of the lip or flange 27 to the line of bend of an angled edge portion 33. The blocking structure also includes a longitudinally extending member 35 similar to the member 31, engaging against the web 26 of the outer facing channel, and also engaging the dam 34 and disposing the latter in its desired position. The dam may be formed integral with the member 35, but it is ordinarily preferable to provide it as a separate member, which may be secured on the dam support member 35, to allow the use of dams of other cross sectional shapes with the dam support member 35. The rib or projection 32 of the dam 31 may similarly be formed as a separate part securable to the dam 31, if desired. Forming the rib or projection 32 and the dam 34 as elements separate from the dams or blocking members 31 and 35 also permits them to be formed of a suitable material, such as nylon, to which the foamed plastic material will not readily adhere, without requiring the members 31 and 35 to be of the same material.

With the inner and outer facings 11 and 12 supported in the jig in the manner just explained, the plastic material which is to form the foamed core for the laminated structure is introduced into the space between the inner and outer facings, through any suitable passage or orifice provided for the purpose, not shown because the same is well known in the art and does not constitute a part of the present invention. The material introduced into the enclosed space foams to fill completely the entire space between the inner and outer facings, developing a considerable total pressure, and is allowed to set to its hardened or rigidified form, after which the laminated structure may be removed from the jig. The rigidified foamed core 36 (FIG. 4) is firmly bonded to both the inner and outer facings or shells by its own inherent adhesive properties, and in addition is mechanically interlocked with and protected by the channel formations of the facings at each edge provided with the channeled construction. As will be apparent from FIG. 4, a groove 37 is defined in the edge of the core 36 between each pair of channel formations 25 and 28, by reason of the use of the dam 31 with its rib 32. The laminated structure is thus formed with a channeled edge. A similar edge construction may, it will be obvious, be provided along other edges of the laminated structure, in substantially the same manner as described. The groove 37 in the edge of core 36 is in this case of a depth equal to the height or width of the flanges or lips 27 and 30, though it might be otherwise if desired. The width of each channel 25 and 28 is approximately one-third of the thickness of the laminated structure, although this also might be varied.

The groove 37 serves to provide protection of the core against damage by reason of its being recessed inwardly from the plane of the edge of the structure wall, and also serves to facilitate gasketing between said edge and a structure or part which may be secured thereto. The webs 26 and 29 of the channel formations cover the spaced lateral edge portions of the core 36, and the flanges 27 and 30, in addition to further covering these edge portions of the core, cooperate with the other portions of the channel formations to provide greater rigidity and strength in the edge of the wall portion of the laminated structure. The channels, as already pointed out, also provide a mechanical interlock with the core, in addition to the bond therebetween, to protect against the possibility of separation of the facings from the core which would be present if a raw edge were provided. The spacing of the channels from each other prevents thermal conduction from one facing to the other, which would minimize or partially nullify the effect of the heat insulation provided by the foamed core 36.

We claim:

1. In a foam core laminated structure having a core of foam plastic material and a pair of sheet material facings one bonded to each face of said core, an edge construction comprising a pair of transversely spaced portions extending longitudinally along an edge of the core with a groove therebetween and adjacent marginal portions of said facings each bent to respectively define a channel with each channel respectively containing one of said spaced portions therein, the terminal free edges of said bent end portions extending into said groove along respective surfaces of said groove, and with said edges spaced apart from each other.

2. A construction substantially as defined in claim 1, in which each of said free edge parts extends at least to the bottom of the groove.

3. In a laminated structure having a core of cellular material and a pair of sheet material facings one adhered to each face of said core, an edge construction comprising a central longitudinal groove formed in an edge of the core, and a pair of transversely spaced channel formations each engaging over a portion of the core extending along said core edge between said groove and one of said facings with each of said channel formations being defined by a marginal portion of the adjacent facing bent to define with its respective facing a channel including a terminal flange extending into said groove and transversely spaced from the other terminal flange.

4. A construction substantially as defined in claim 3, in which each terminal flange extends at least to the bottom of the groove.

5. In a laminated structure having a core of cellular material and a pair of sheet material facings one adhered to each face of said core, an edge construction comprising a pair of transversely spaced channels extending longitudinally along an edge of the structure each defined by the adjacent marginal portion of one of said facings bent to extend over the adjacent core edge toward the other facing for a distance less than half the thickness of the core with each of said bent marginal portions having a terminal lip extending inwardly therefrom between the facings and spaced from the other lip.

6. In a method of forming a laminated rigid cellular core structure with an edge construction protecting an edge of said core and avoiding heat transfer therethrough, including the steps of providing a form for at least a portion of said structure, shaping on said form a facing for the structure, disposing the shaped facing in generally parallel spaced relation to another facing, enclosing along the edges of said facings the space therebetween, and introducing into said space a material rigidifiable into said cellular core while supporting the facings against deformation by said material to provide the laminated structure upon rigidification of said material, the improvement comprising the steps of supporting said shaped facing by said form during said material introduction, prior to said material introduction defining with the facings a pair of laterally spaced channels by bending adjacent marginal portions of the facings to extend each less than half the distance across said space and inwardly between the facings, and blocking the space between said channels.

7. In a method of forming a laminated rigid foam core structure with an edge construction protecting an edge of said core and avoiding heat transfer therethrough, including the steps of providing a form for at least a portion of said structure, shaping on said form a facing for the structure, disposing the shaped facing in generally parallel spaced relation to another facing, enclosing along the edges of said facings the space therebetween, and introducing into said space a rigidifiable foaming material while supporting the facings against the foaming pressure to provide the laminated structure upon rigidification of said material, the improvement comprising the steps of bending adjacent marginal portions of the facings into a pair of transversely spaced channels prior to said material introduction each with a web portion extending less than half way across said space and a lip extending from said web portion in said space and spaced from the lip of the other channel, and blocking part of the space between said lips during introduction and rigidification of the core material.

8. A method substantially as defined in claim 7, wherein the blocking of the space between the lips extends to the free edges of the lips.

9. In a method of forming a laminated structure with a rigid cellular core and an edge construction protecting an edge of said core and avoiding heat transfer therethrough, including the steps of providing a form for at least a portion of said structure, shaping on said form one facing for the structure, disposing the shaped facing in generally parallel spaced relation to another facing, enclosing along the edges of said facings the space therebetween, and introducing into said space a material rigidifiable into said cellular core to provide the laminated structure upon rigidification of said material, the improvement comprising the steps of bending adjacent marginal portions of the facings prior to said material introduction to define with the respective facings a pair of channel formations each extending less than half the distance across said space and also extending between the facings and spaced transversely from each other, and during the material introduction and rigidification blocking the space between said channel formations to a depth leaving at least a part of the bent marginal portions between the facings free of the core material.

References Cited

UNITED STATES PATENTS

| | | |
|---|---|---|
| 2,896,271 | 7/1959 | Kloote et al. |
| 2,946,712 | 7/1960 | Greig _____ 161—161 XR |
| 3,132,382 | 5/1964 | Magester _____ 264—54 XR |
| 3,137,744 | 6/1964 | Burrus _____ 264—54 XR |
| 3,221,085 | 11/1965 | Rill et al. _____ 264—45 |

FOREIGN PATENTS

| | | |
|---|---|---|
| 242,233 | 12/1962 | Australia. |
| 1,308,474 | 9/1962 | France. |

ROBERT F. BURNETT, *Primary Examiner.*

WILLIAM A. POWELL, *Assistant Examiner.*

U.S. Cl. X.R.

156—79, 196; 161—149, 161; 52—309, 743; 264—45, 261